(No Model.)
E. WOLF.
PETROLEUM HEATER.
No. 560,014.  Patented May 12, 1896.
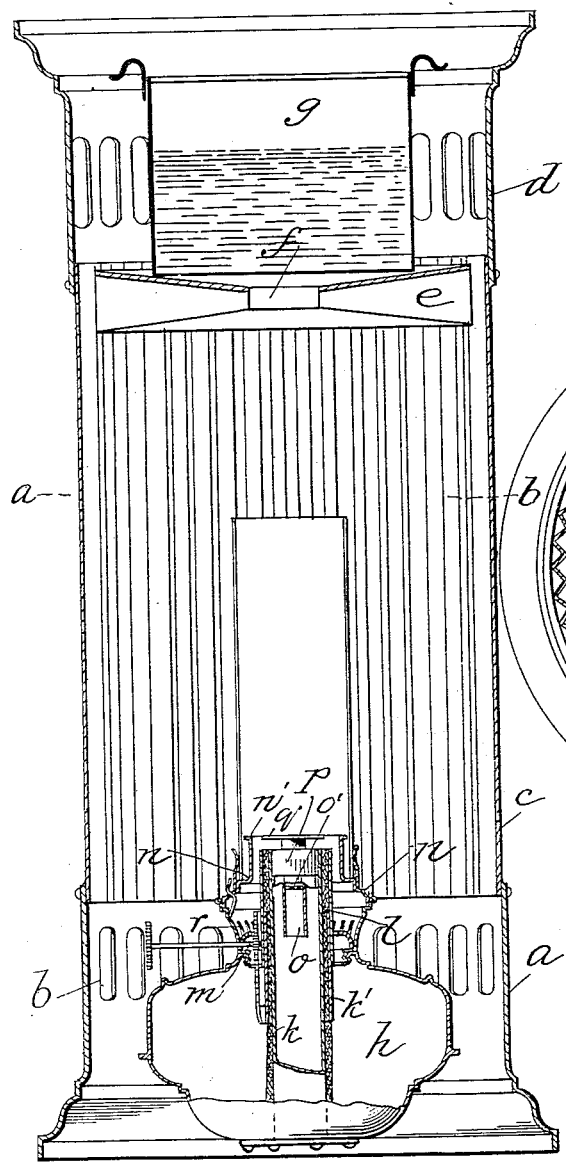
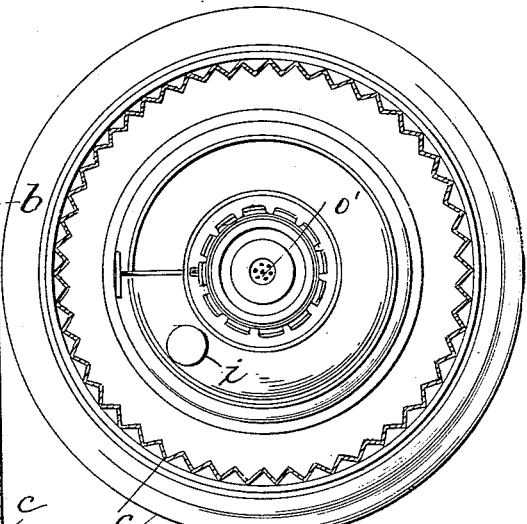
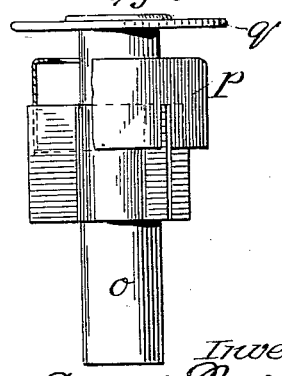
Attest:
Wallern Donaldson
James M. Shea
Inventor
Ernst Wolf
by Richards & Co.
Attys

UNITED STATES PATENT OFFICE.

ERNST WOLF, OF ZWICKAU, GERMANY, ASSIGNOR TO PHILIP JOSEPH OETTINGER, OF NEW YORK, N. Y.

PETROLEUM-HEATER.

SPECIFICATION forming part of Letters Patent No. 560,014, dated May 12, 1896.

Application filed October 26, 1895. Serial No. 567,045. (No model.)

*To all whom it may concern:*

Be it known that I, ERNST WOLF, a subject of the King of Saxony, residing at Zwickau, Saxony, Germany, have made a new and useful Improvement in Petroleum-Heaters, of which the following is a clear and exact specification.

My invention is an improved heater; and it consists, first, in the construction and arrangement of the heater proper, which is in the form of a lamp, and, secondly, in the construction and arrangement of the inclosing shell or mantle.

In the accompanying drawings, Figure 1 represents a sectional view of the complete heater, Fig. 2 being a cross-section of the same on the line $a\ b$ of Fig. 1. Fig. 3 is a detail view of the air-distributer.

In the drawings the base of the inclosing shell or mantle is shown at $a$ and is preferably made of sheet or cast metal, provided with a series of air-inlet openings $b$. Extending up from the base $a$ is a sheet-metal body $c$, made of corrugated metal, as shown clearly in Fig. 2. Surmounting this body portion $c$ is a sheet or cast metal top $d$, similar to the base $a$, except that it is inverted. A deflector $e$, which is in the shape of a disk having corrugations radiating from the center thereof, is suitably supported at the top of the body $c$, with a space around its edge for the escape of the heat and with a central opening $f$. Directly above this deflector is a water-tank $g$ for providing the necessary moisture.

The heat-producer which I use is shown in the sectional view just within the base $a$, and it comprises a reservoir $h$ of ordinary construction provided with a filling-orifice $i$ and a central air-tube $k$, which extends through the center of the lamp and is open at the bottom. A wick-carrier is shown at $k'$ in the form of a tube inclosing the wick and to which the wick may be secured, and this tube is fitted within a tube $l$ of larger diameter, this latter tube extending centrally from the burner proper, which is secured centrally of the lamp by its screw-threaded lower end. This burner carries a raising spindle and gear $m$, and the gear meshes with a rack secured to the tube $k'$, the end of the rack passing up through the burner in contact with the gear. The burner is provided with an outwardly-flaring skirt, which has a series of openings for the inlet of the air. A metal cap $n$ fits the skirt of the burner and is removably secured thereto, and this cap is provided with a central tube $n'$, surrounding the outer wick-tube, and is also provided with a support for the chimney.

Within the center draft-tube I locate an air-distributer, which is in the form of a tube $o$, open at top and bottom and provided with a perforated disk $o'$, arranged centrally thereof, and to provide support for this tube I construct it with three radiating arms connected by a flange, as shown at $p$. The flange is circular and accurately fits the interior of the air-tube. The air-distributer tube is provided with a deflector at its upper end, as shown at $q$, and this turns the flame outwardly, flaring it. An air-passage is formed between the outer wall of the wick-tube and the tube $n'$, and the air passing up through the same to feed the flame enters into this space through the series of openings $r$ in the lower skirt of the burner.

The air for the combustion passes up the central tube around the outer side of the tube $o$ and is deflected outwardly to the flame by the flange $p$. The air passing through the tube $o$ meets the mingled gases above the burner and aids in their perfect combustion.

What I claim is—

In a lamp, the tube $l$ and an outer shell having an air-passage between, the air-tube $k$, the interior tube $o$ having the deflector at its open upper end and the perforated disk within, and means for supporting the inner air-tube $o$ within the tube $k$ consisting of the radial arms and the flange $p$ fitting within the tube $k$.

In testimony whereof I have signed my name to this specification in the presence of two subscribing witnesses.

ERNST WOLF.

Witnesses:
 FRIEDR. KÖRNER,
 RUDOLPH FRICKE.